(12) United States Patent
Jackson (10) Patent No.: US 12,077,050 B2
(45) Date of Patent: Sep. 3, 2024

(54) HYBRID AUTOMATED MANUAL TRANSMISSION

(71) Applicant: Eaton Cummins Automated Transmission Technologies LLC, Galesburg, MI (US)

(72) Inventor: Graeme Andrew Jackson, Kalamazoo, MI (US)

(73) Assignee: Eaton Cummins Automated Transmission Technologies LLC, Galesburg, MI (US)

(*) Notice: Subject to any disclaimer, the term of this patent is extended or adjusted under 35 U.S.C. 154(b) by 0 days.

(21) Appl. No.: 17/959,549

(22) Filed: Oct. 4, 2022

(65) Prior Publication Data

US 2023/0113191 A1 Apr. 13, 2023

Related U.S. Application Data

(60) Provisional application No. 63/254,250, filed on Oct. 11, 2021.

(51) Int. Cl.
*B60K 6/547* (2007.10)
*B60K 6/365* (2007.10)
*F16H 3/00* (2006.01)
*F16H 37/04* (2006.01)

(52) U.S. Cl.
CPC ............. *B60K 6/547* (2013.01); *B60K 6/365* (2013.01); *F16H 3/006* (2013.01); *F16H 37/046* (2013.01); *F16H 2003/008* (2013.01)

(58) Field of Classification Search
CPC ......... B60K 6/547; B60K 6/365; F16H 3/006; F16H 37/046; F16H 2003/008
USPC ........................................................ 475/207
See application file for complete search history.

(56) References Cited

U.S. PATENT DOCUMENTS

| | | | |
|---|---|---|---|
| 2012/0234133 A1* | 9/2012 | Ikegami | B60W 30/18127 903/902 |
| 2013/0345010 A1* | 12/2013 | Kaltenbach | B60K 6/547 475/5 |
| 2013/0345018 A1 | 12/2013 | Kaltenbach et al. | |
| 2014/0100072 A1 | 4/2014 | Kaltenbach et al. | |
| 2014/0144288 A1 | 5/2014 | Glueckler | |
| 2015/0111694 A1 | 4/2015 | Kim | |
| 2015/0167804 A1 | 6/2015 | Lee et al. | |
| 2016/0089968 A1 | 3/2016 | Lee et al. | |
| 2016/0091063 A1* | 3/2016 | Rekow | B60W 20/30 475/153 |
| 2021/0268891 A1 | 9/2021 | Hunold et al. | |

\* cited by examiner

*Primary Examiner* — Colby M Hansen
(74) *Attorney, Agent, or Firm* — Harness, Dickey & Pierce, P.L.C.

(57) ABSTRACT

A hybrid automated manual transmission includes an input shaft configured to be connected to a prime mover by an input clutch. At least one splitter gear connectable to the input shaft. A main shaft is concentric with the input shaft and includes at least two main shaft gears connectable to the main shaft. At least one countershaft includes at least one first driven gears drivingly engaged with the at least one splitter gear and at least two second driven gears drivingly engaged with the at least two main shaft gears. A motor generator is drivingly connected to the input shaft.

4 Claims, 10 Drawing Sheets

HYBRID AUTOMATED MANUAL TRANSMISSION

CROSS-REFERENCE TO RELATED APPLICATIONS

This application claims the benefit of U.S. Provisional Application No. 63/254,250, filed on Oct. 11, 2021. The entire disclosure of the above application is incorporated herein by reference.

FIELD

The present disclosure relates to a hybrid automated manual transmission.

BACKGROUND

This section provides background information related to the present disclosure which is not necessarily prior art.

Hybrid and mild hybrid vehicle drivetrains are becoming common in the cargo truck industry to provide ancillary power, regeneration/recovery, and boost. Existing solutions are offered but lack the ability to provide features when the engine is off. Accordingly, it is desirable to provide a hybrid transmission with an ability to provide selected operations when the engine is off.

SUMMARY

This section provides a general summary of the disclosure, and is not a comprehensive disclosure of its full scope or all of its features.

Several gearing and mounting architectures are disclosed to provide motor generator (MG) connections to optimize possible speed ratios between vehicle and MG. Vehicle packaging is a specific consideration for the various options as well as preserving PTO and retarder capability.

According to an aspect of the present disclosure, a hybrid automated manual transmission, includes an input shaft configured to be connected to a prime mover by an input clutch. At least one splitter gear is connectable to the input shaft. A main shaft is concentric with the input shaft and includes at least two main shaft gears connectable to the main shaft. At least one countershaft includes at least one first driven gear drivingly engaged with the at least one splitter gear and at least two second driven gears drivingly engaged with the at least two main shaft gears. A motor generator is drivingly connected to the input shaft by a reduced gear ratio.

According to an aspect of the present disclosure, a hybrid automated manual transmission includes an input shaft configured to be connected to a prime mover by an input clutch. At least one splitter gear is connectable to the input shaft. A main shaft is coaxial with the input shaft and includes at least two main shaft gears connectable to the main shaft. At least one countershaft includes at least one first driven gear drivingly engaged with the at least one splitter gear and at least two second driven gears drivingly engaged with the at least two main shaft gears. A motor generator is concentric with the input shaft and drivingly connected to the input shaft by a planetary gear system.

According to an aspect of the present disclosure, a hybrid automated manual transmission includes an input shaft configured to be connected to a prime mover by an input clutch. At least one splitter gear is connectable to the input shaft. A main shaft is coaxial with the input shaft and includes at least two main shaft gears connectable to the main shaft. At least one countershaft includes at least one first driven gear drivingly engaged with the at least one splitter gear and at least two second driven gears drivingly engaged with the at least two main shaft gears. A motor generator is drivingly connected to the input shaft by a gear mounted to the input shaft.

According to a further aspect, a hybrid automated manual transmission includes an input shaft configured to be connected to a prime mover by an input clutch. At least one splitter gear connectable to the input shaft. A main shaft is coaxial with the input shaft and includes at least two main shaft gears connectable to the main shaft. At least one countershaft includes at least one first driven gear drivingly engaged with the at least one splitter gear and at least two second driven gears drivingly engaged with the at least two main shaft gears. A motor generator drivingly connected to the countershaft.

Further areas of applicability will become apparent from the description provided herein. The description and specific examples in this summary are intended for purposes of illustration only and are not intended to limit the scope of the present disclosure. The AMT illustrated as a 2×3×2 twin countershaft can be any variant of AMT such as a single countershaft or other multi-speed architectures 6×1, 5×2, 2×4×2, 3×2×2 and so on.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
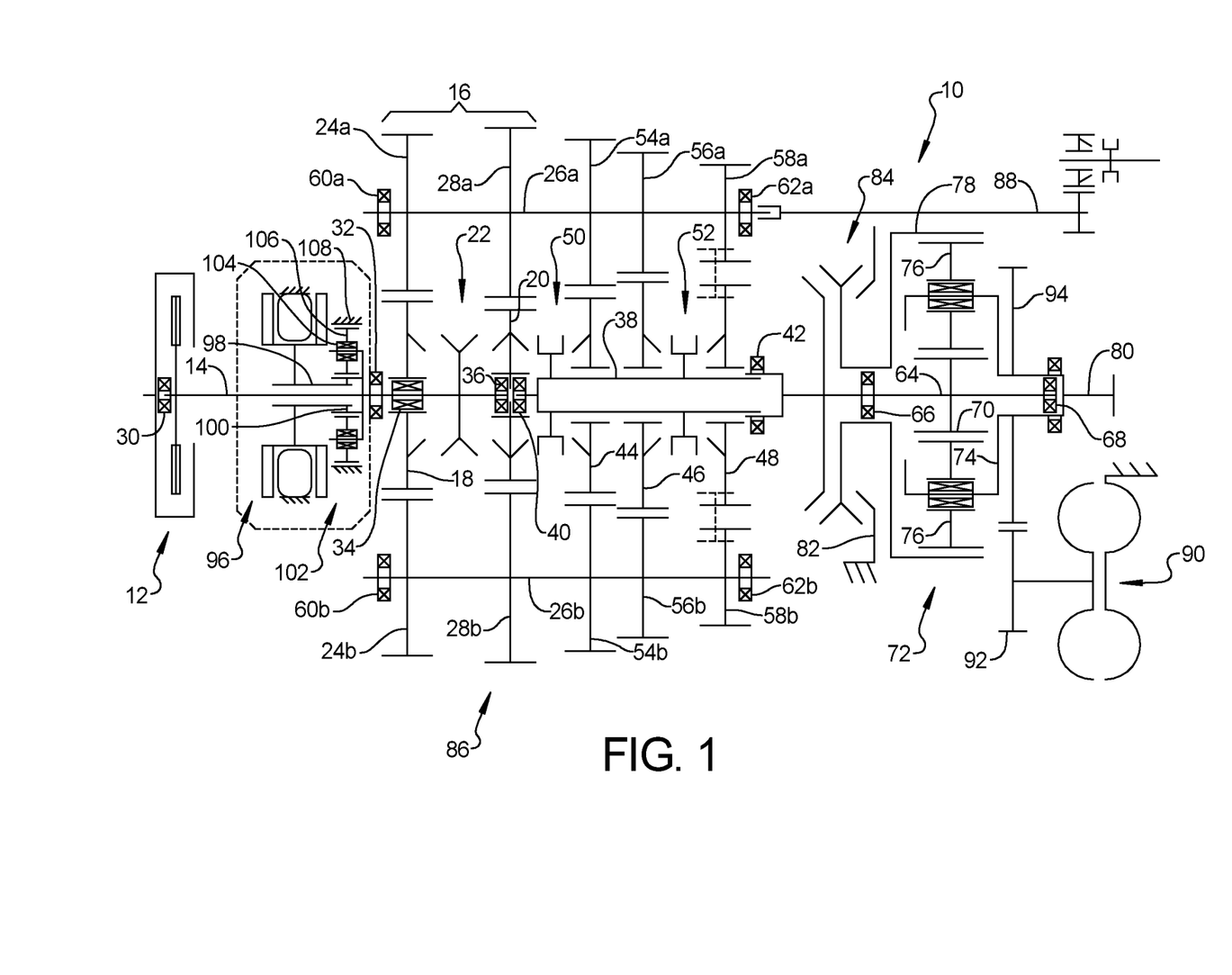
FIG. 1 is a schematic view of a hybrid automated manual transmission according to the principles of the present disclosure.

With reference to FIG. 1, a hybrid automated manual transmission 10 according to the principles of the present disclosure will now be described. The transmission includes an input clutch 12 that provides a driving connection from a prime mover (not shown) to an input shaft 14. A splitter section 16 includes a first splitter gear 18 and a second splitter gear 20 that are drivingly connectable to the input shaft 14 by a first clutch 22. The first splitter gear 18 is engaged with a pair of first driven gears 24a, 24b provided on a pair of countershafts 26a, 26b. The second splitter gear 20 is engaged with a pair of second driven gears 28a, 28b provided on the pair of countershafts. The input shaft is supported by a front input shaft bearing 30, a first and a second intermediate input shaft bearings 32, 34 and a rear input shaft bearing 36.

A main shaft 38 is concentric with the input shaft 14 and is supported by a forward main shaft bearing 40 and a rear main shaft bearing 42. The main shaft 38 supports a first main shaft gear 44, a second main shaft gear 46 and a third main shaft gear 48. A first main shaft clutch 50 is engageable with the second splitter gear 20 and the first main shaft gear 44. A second main shaft clutch 52 is engageable with the second main shaft gear 46 and the third main shaft gear 48. The first main shaft gear 44 is in driving engagement with a pair of third driven gears 54a, 54b on the pair of countershafts 28a, 28b. The second main shaft gear 46 is in driving engagement with a pair of third driven gears 56a, 56b on the pair of countershafts 28a, 28b. The third main shaft gear 48 is in driving engagement with a pair of third driven gears 58a, 58b on the pair of countershafts 28a, 28b.

The pair of countershafts 28a, 28b are each supported by a forward countershaft bearing 60a, 60b and a rearward countershaft bearing 62a, 62b.

A range gear shaft 64 is in a splined connection with and coaxial with the main shaft 38. The range gear shaft 64 is supported by the rear main shaft bearing 42, an intermediate range gear shaft bearing 66 and a rear range gear shaft bearing 68. The range gear shaft is connected to a sun gear 70 of a range gear system 72. A range gear system 72 include a planetary carrier 74 that supports a plurality of planetary pinions 76 that are in meshing engagement with the sun gear 70 and a ring gear 78. The planetary carrier 74 is connected to an output shaft 80. The ring gear 78 can be connected to the range gear shaft 64 or alternatively to a fixed portion 82 by a range gear clutch 84 for shifting between a high and a low speed gear.

A first PTO interface 86 is provided with one of the countershaft gears and particularly with the second driven gear 28b of the countershaft 26b. A second PTO interface including PTO shaft 88 is provided for connection with an end of the countershaft 26a.

A retarder 90 is in driving engagement with a gear 92 in meshing engagement with a retarder gear 94 provided on the output shaft 80.

A motor generator 96 is mounted concentric with the input shaft 14 and includes an output shaft 98 that is connected to a sun gear 100 of a planetary gear system 102. A planetary carrier 104 is connected to the input shaft 14 and includes a plurality of planetary gears 106 that are in meshing engagement with the sun gear 100 and a fixed ring gear 108. The motor generator 96 and planetary gear system 102 provides driving input to the input shaft 14. The motor generator 96 is drivingly connected to the input shaft 14 by a reduced gear ratio via the planetary gear system 102.

Figures 2, 2A:
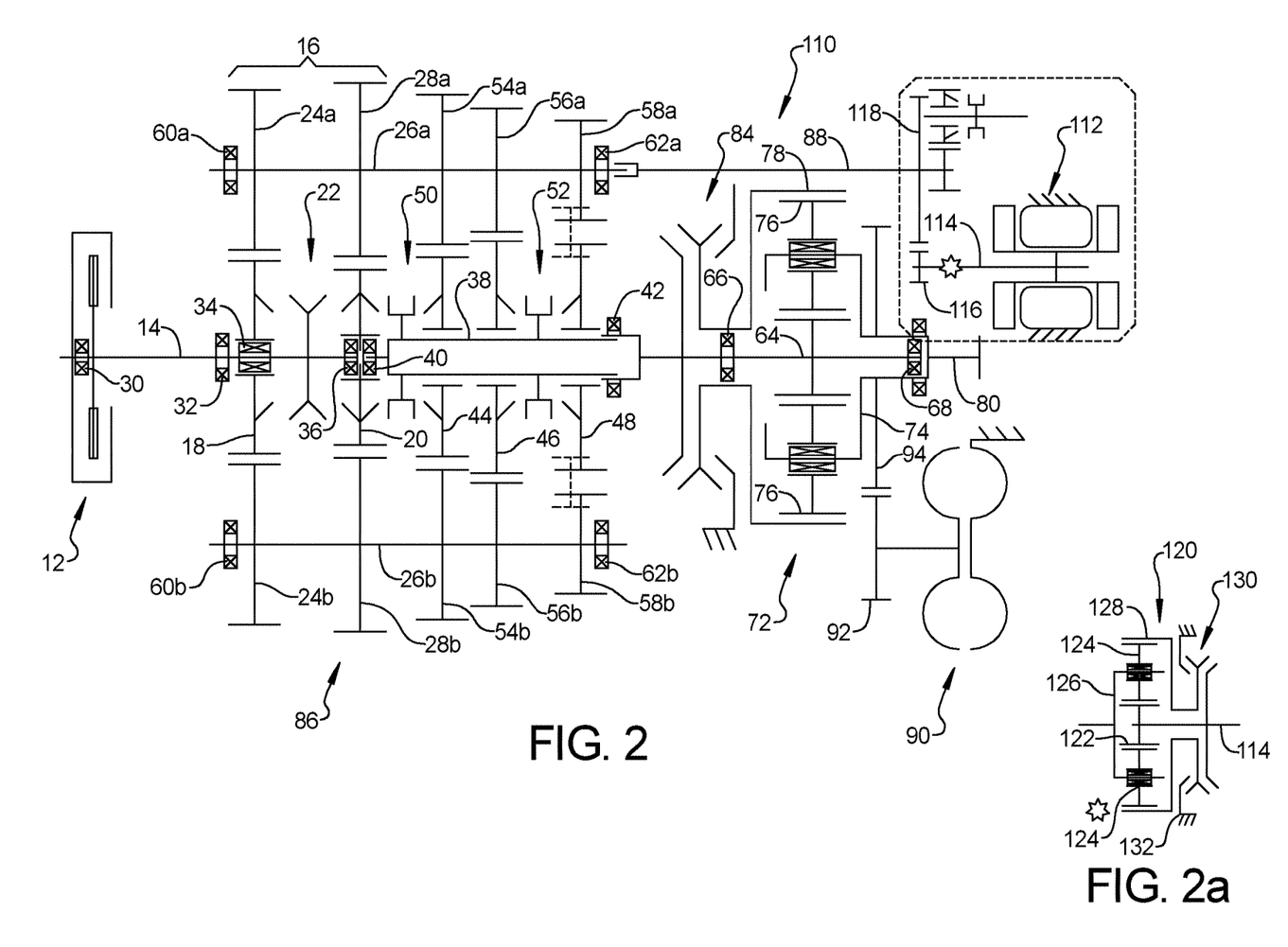
FIG. 2 is a schematic view of a hybrid automated manual transmission according to a second embodiment of the present disclosure.
FIG. 2a is a schematic view of an alternative connection between the motor generator and the drive gear.

With reference to FIG. 2, wherein like reference numerals are used to represent the same or similar elements as disclosed in FIG. 1, an alternative hybrid automated transmission 110 is shown wherein a motor generator 112 is drivingly connected to the PTO shaft 88. The motor generator 112 includes an output shaft 114 that includes a drive gear 116 that is in driving engagement with a driven gear 118 provided on the PTO shaft 88. The motor generator 112 and PTO shaft 88 provide driving input to the countershaft 26a.

As a further alternative as shown in FIG. 2a, the output shaft 114 of the motor generator 112 can be connected to the drive gear 116 by a 2-speed planetary gear system 120. In particular, the output shaft can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 114 of the motor generator 112 or to a fixed portion 132.

Figures 3, 3A:
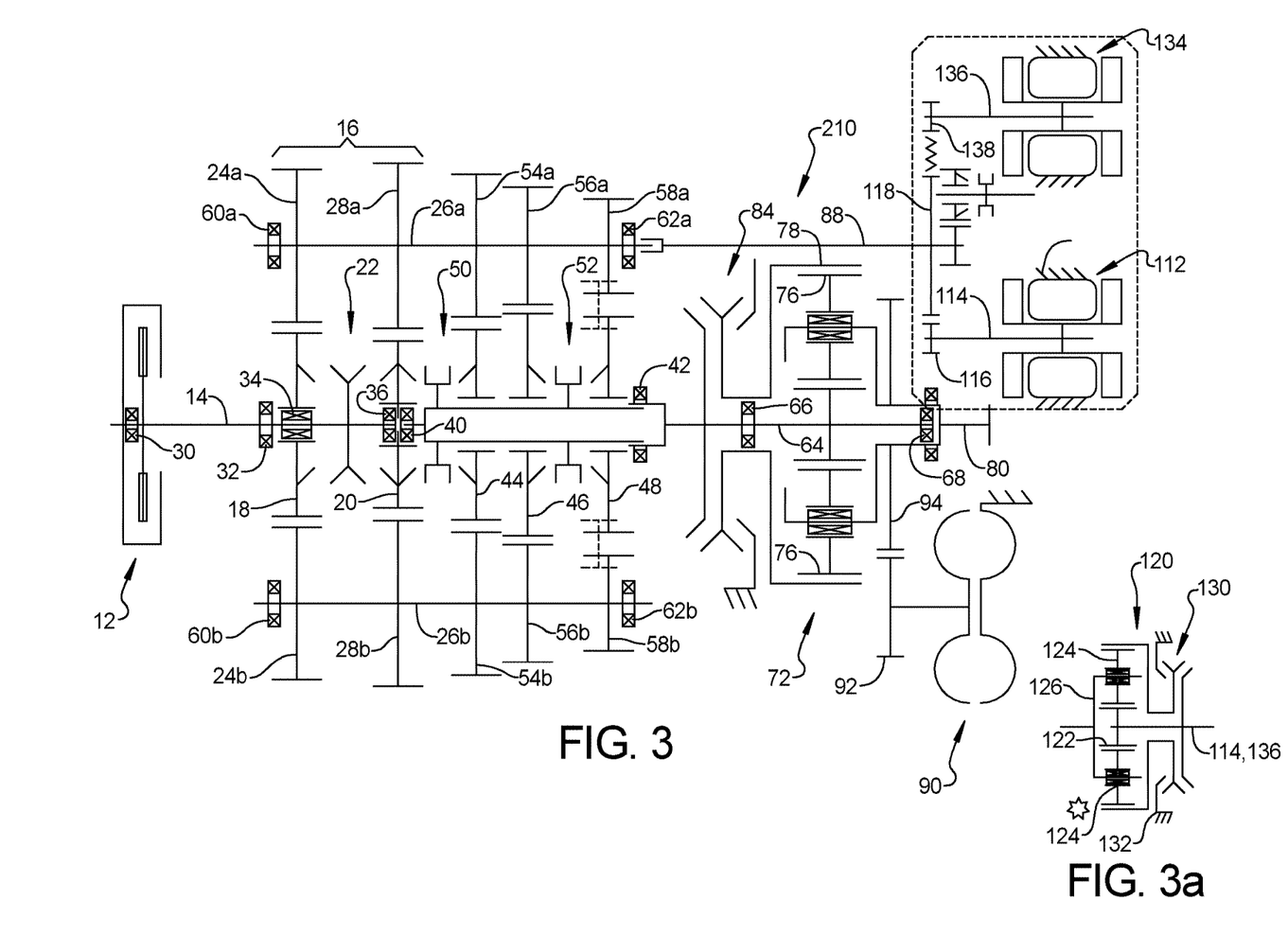
FIG. 3 is a schematic view of a hybrid automated manual transmission according to a third embodiment of the present disclosure.
FIG. 3a is a schematic view of an alternative connection between the motor generator and the drive gear.

As a further alternative as shown in FIG. 3, wherein like reference numerals are used to represent the same or similar elements as disclosed in FIG. 2, a hybrid automated transmission 210 includes a second motor generator 134 that is also drivingly connected to the PTO shaft 88. The second motor generator 134 includes an output shaft 136 that includes a drive gear 138 that is in driving engagement with the driven gear 118 provided on the PTO shaft 88. The motor generator 112 and the second motor generator 134 and PTO shaft 88 provide driving input to the countershaft 26a.

As a further alternative as shown in FIG. 3a, the output shaft 114 of the motor generator 112 and the output shaft 136 of the second motor generator 134 can be connected to the drive gear 116 by a 2-speed planetary gear system 120. In particular, the output shaft 114 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 114, 136 of the respective motor generator 112, 134 or to a fixed portion 132.

Figures 4, 4A:
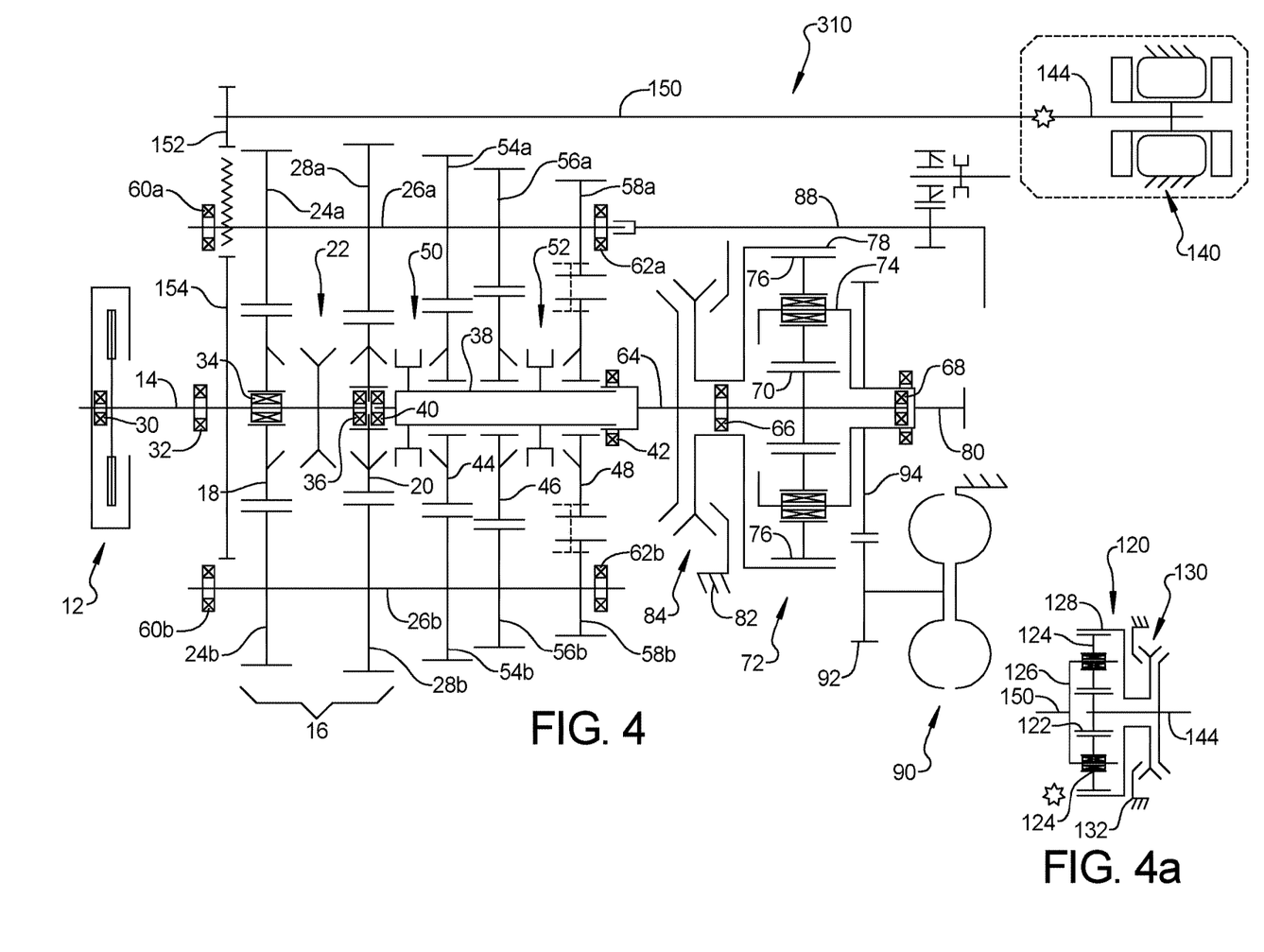
FIG. 4 is a schematic view of a hybrid automated manual transmission according to a fourth embodiment of the present disclosure.
FIG. 4a is a schematic view of an alternative connection between the motor generator and the drive gear.

With reference to FIG. 4, a hybrid automated manual transmission 310 according to the principles of the present disclosure will now be described. The transmission includes an input clutch 12 that provides a driving connection from a prime mover (not shown) to an input shaft 14. A splitter section 16 includes a first splitter gear 18 and a second splitter gear 20 that are drivingly connectable to the input shaft 14 by a first clutch 22. The first splitter gear 18 is engaged with a pair of first driven gears 24a, 24b provided on a pair of countershafts 26a, 26b. The second splitter gear 20 is engaged with a pair of second driven gears 28a, 28b provided on the pair of countershafts 26a, 26b. The input shaft 14 is supported by a front input shaft bearing 30, a first and a second intermediate input shaft bearings 32, 34 and a rear input shaft bearing 36.

A main shaft 38 is concentric with the input shaft 14 and is supported by a forward main shaft bearing 40 and a rear main shaft bearing 42. The main shaft 38 supports a first main shaft gear 44, a second main shaft gear 46 and a third main shaft gear 48. A first main shaft clutch 50 is engageable with the second splitter gear 20 and the first main shaft gear 44. A second main shaft clutch 52 is engageable with the second main shaft gear 46 and the third main shaft gear 48. The first main shaft gear 44 is in driving engagement with a pair of third driven gears 54a, 54b on the pair of countershafts 28a, 28b. The second main shaft gear 46 is in driving engagement with a pair of third driven gears 56a, 56b on the pair of countershafts 28a, 28b. The third main shaft gear 48 is in driving engagement with a pair of third driven gears 58a, 58b on the pair of countershafts 28a, 28b.

The pair of countershafts 28a, 28b are each supported by a forward countershaft bearing 60a, 60b and a rearward countershaft bearing 62a, 62b.

A range gear shaft 64 is in a splined connection with and coaxial with the main shaft 38. The range gear shaft 64 is supported by the rear main shaft bearing 42, an intermediate range gear shaft bearing 66 and a rear range gear shaft bearing 68. The range gear shaft is connected to a sun gear 70 of a range gear system 72. The range gear system 72 includes a planetary carrier 74 that supports a plurality of planetary pinions 76 that are in meshing engagement with the sun gear 70 and a ring gear 78. The planetary carrier 74 is connected to an output shaft 80. The ring gear 78 can be connected to the range gear shaft 64 or alternatively to a fixed portion 82 by a range gear clutch 84 for shifting between a high and a low speed gear.

A first PTO interface 86 is provided with one of the countershaft gears and particularly with the second driven gear 28b of the countershaft 26b. A second PTO interface including PTO shaft 88 is provided for connection with an end of the countershaft 26a.

A retarder 90 is in driving engagement with a gear 92 in meshing engagement with a retarder gear 94 provided on the output shaft 80.

A motor generator 140 is mounted at a rear end of the transmission 310 and is drivingly connected to the input shaft 14. The motor generator 140 includes an output shaft 144 that includes a drive gear 152 that is in meshing engagement with a gear 154 on the input shaft 14. The motor generator 140 and shaft 150 provide driving input to the input shaft 14.

As a further alternative as shown in FIG. 4a, the output shaft 144 of the motor generator 140 can be connected to the drive gear 152 by a 2-speed planetary gear system 120. In particular, the output shaft 144 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 144 of the motor generator 112 or to a fixed portion 132.

Figures 5, 5A:
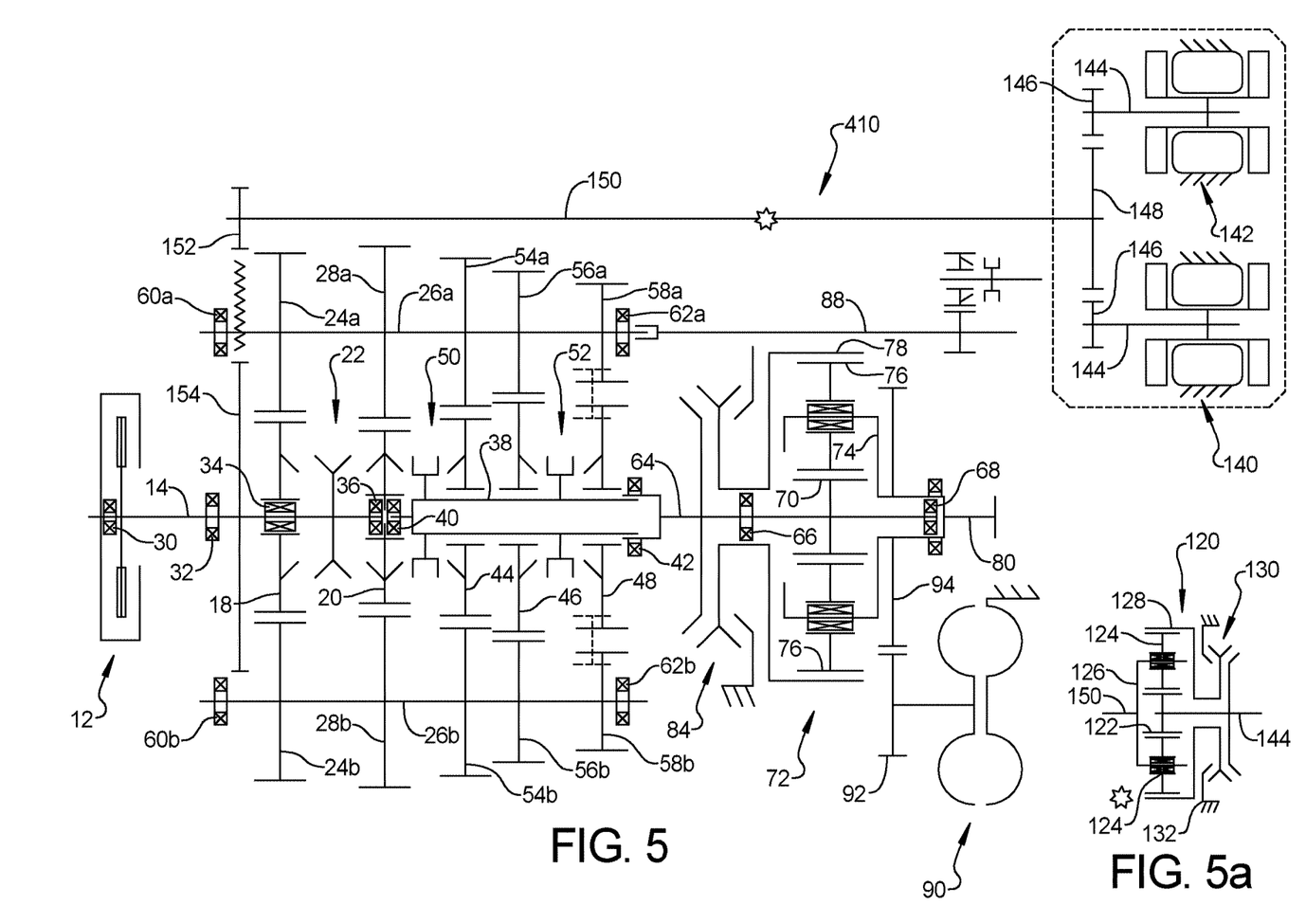
FIG. 5 is a schematic view of a hybrid automated manual transmission according to a fifth embodiment of the present disclosure.
FIG. 5a is a schematic view of an alternative connection between the motor generator and the drive gear.

With reference to FIG. 5, wherein like reference numerals are used to represent the same or similar elements as disclosed in FIG. 1, an alternative hybrid automated transmission 410 is shown wherein a first motor generator 140 and a second motor generator 142 are mounted at a rear end of the transmission 410 and are drivingly connected to the input shaft 14. The first motor generator 140 and the second motor generator 142 each include an output shaft 144 that include a drive gear 146 that is in driving engagement with a driven gear 148 provided on an elongated shaft 150 that has a gear 152 that is in meshing engagement with a gear 154 on the input shaft 14. The motor generators 140, 142 and shaft 150 provide driving input to the input shaft 14.

As a further alternative as shown in FIG. 5a, the output shafts 144 of the motor generators 140, 142 can be connected to the drive gear 146 by a 2-speed planetary gear system 120. In particular, the output shaft 144 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 144 of the motor generator 112 or to a fixed portion 132.

Figures 6, 6A:
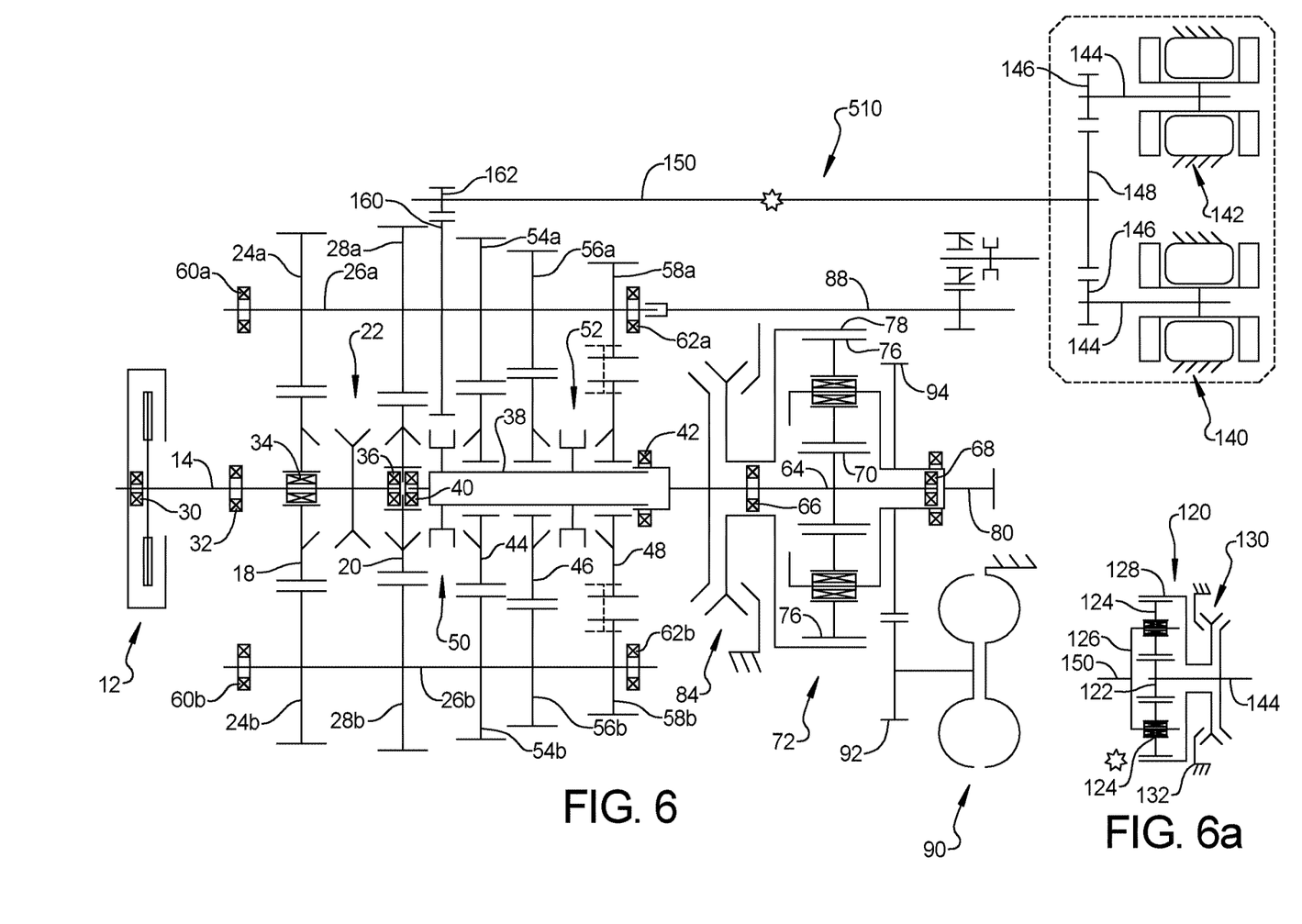
FIG. 6 is a schematic view of a hybrid automated manual transmission according to a sixth embodiment of the present disclosure.
FIG. 6a is a schematic view of an alternative connection between the motor generator and the drive gear.

With reference to FIG. 6, wherein like reference numerals are used to represent the same or similar elements as disclosed in FIG. 1, an alternative hybrid automated transmission 510 is shown wherein a first motor generator 140 and a second motor generator 142 are mounted at a rear end of the transmission 510 and are drivingly connected to a gear 160 provided on the countershaft 26a. The first motor generator 140 and the second motor generator 142 each include an output shaft 144 that include a drive gear 146 that is in driving engagement with a driven gear 148 provided on an elongated shaft 150 that has a gear 162 that is in meshing engagement with the gear 160 on the countershaft 26a. The motor generators 140, 142 and shaft 150 provide driving input to the countershaft 26a.

As a further alternative as shown in FIG. 6a, the output shafts 144 of the motor generators 140, 142 can be connected to the drive gear 146 by a 2-speed planetary gear system 120. In particular, the output shaft 144 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 144 of the motor generator 112 or to a fixed portion 132.

Figures 7, 7A:
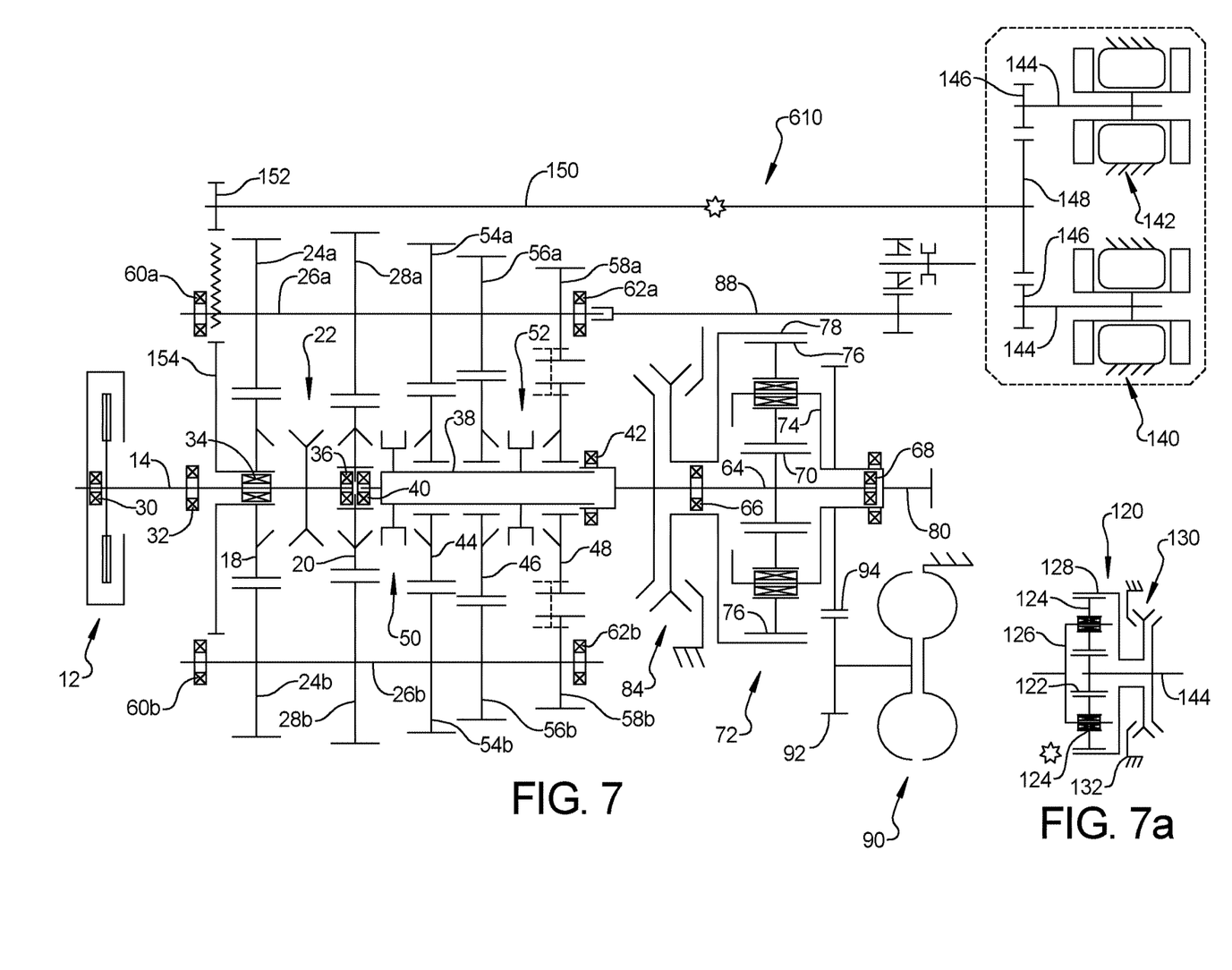
FIG. 7 is a schematic view of a hybrid automated manual transmission according to a seventh embodiment of the present disclosure.
FIG. 7a is a schematic view of an alternative connection between the motor generator and the drive gear.

With reference to FIG. 7, wherein like reference numerals are used to represent the same or similar elements as disclosed in FIG. 1, an alternative hybrid automated transmission 610 is shown wherein a first motor generator 140 and a second motor generator 142 are mounted at a rear end of the transmission 610 and are drivingly connected to the first splitter gear 18. The first motor generator 140 and the second motor generator 142 each include an output shaft 144 that include a drive gear 146 that is in driving engagement with a driven gear 148 provided on an elongated shaft 150 that has a gear 152 that is in meshing engagement with a gear 154 connected to the first splitter gear 18. The motor generators 140, 142 and shaft 150 provide driving input to the first splitter gear 18.

As a further alternative as shown in FIG. 7a, the output shafts 144 of the motor generators 140, 142 can be connected to the drive gear 146 by a 2-speed planetary gear system 120. In particular, the output shaft 144 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 144 of the motor generators 140, 142 or to a fixed portion 132.

Figures 8, 8A:
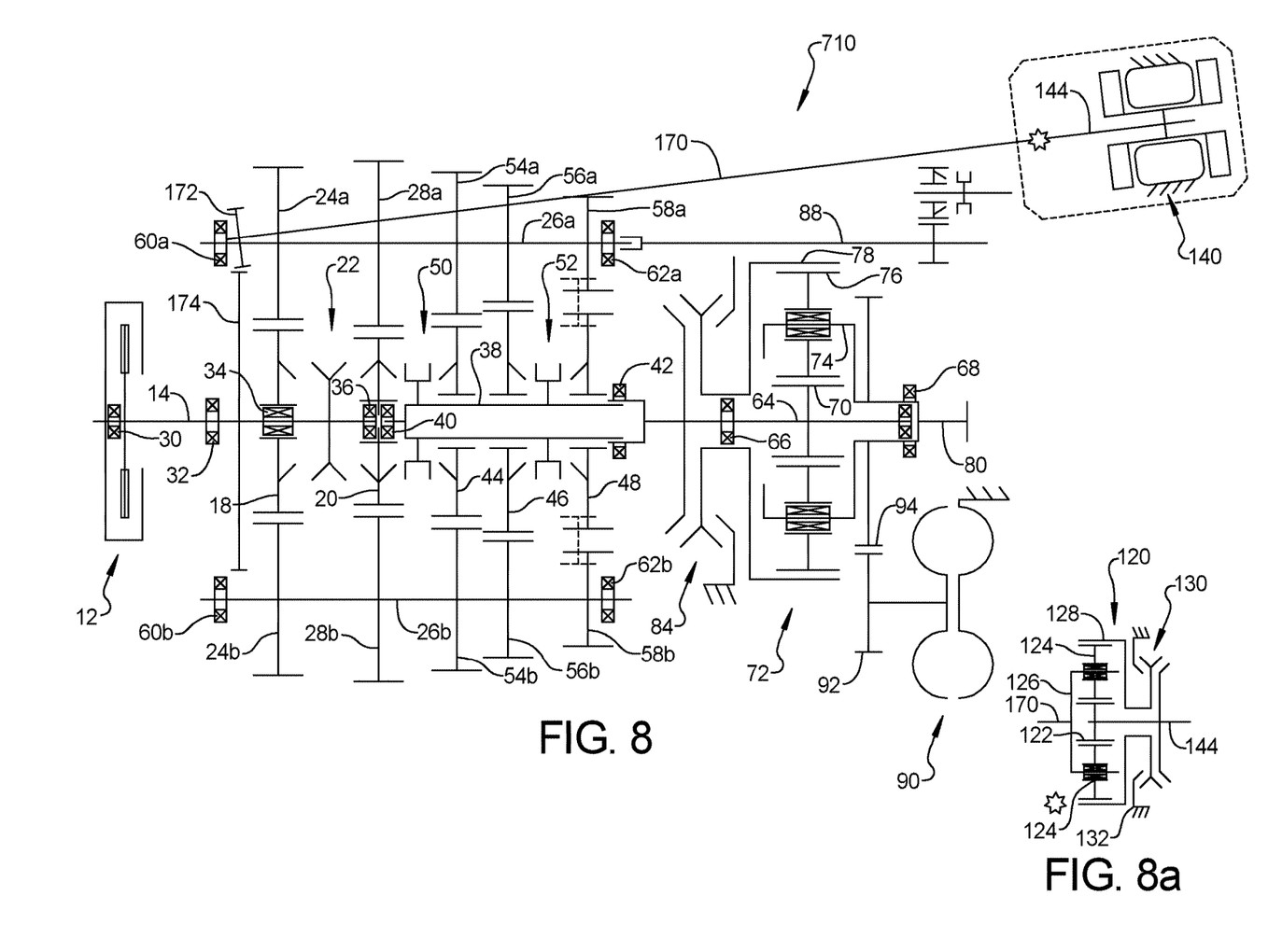
FIG. 8 is a schematic view of a hybrid automated manual transmission according to an eighth embodiment of the present disclosure.
FIG. 8a is a schematic view of an alternative connection between the motor generator and the drive gear.

With reference to FIG. 8, wherein like reference numerals are used to represent the same or similar elements as disclosed in FIG. 1, an alternative hybrid automated transmission 710 is shown wherein a motor generator 140 is mounted at a rear end of the transmission 710 and is drivingly connected to the input shaft 14. The motor generator 140 includes an output shaft 144 that is in driving engagement with an angularly arranged elongated shaft 170 that has a bevel gear 172 that is in meshing engagement with a bevel gear 174 on the input shaft 14. The motor generator 140 and shaft 170 provide driving input to the input shaft 14.

As a further alternative as shown in FIG. 8a, the output shaft 144 of the motor generator 140 can be connected to the drive gear 146 by a 2-speed planetary gear system 120. In particular, the output shaft 144 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 144 of the motor generator 112 or to a fixed portion 132.

Figures 9, 9A:
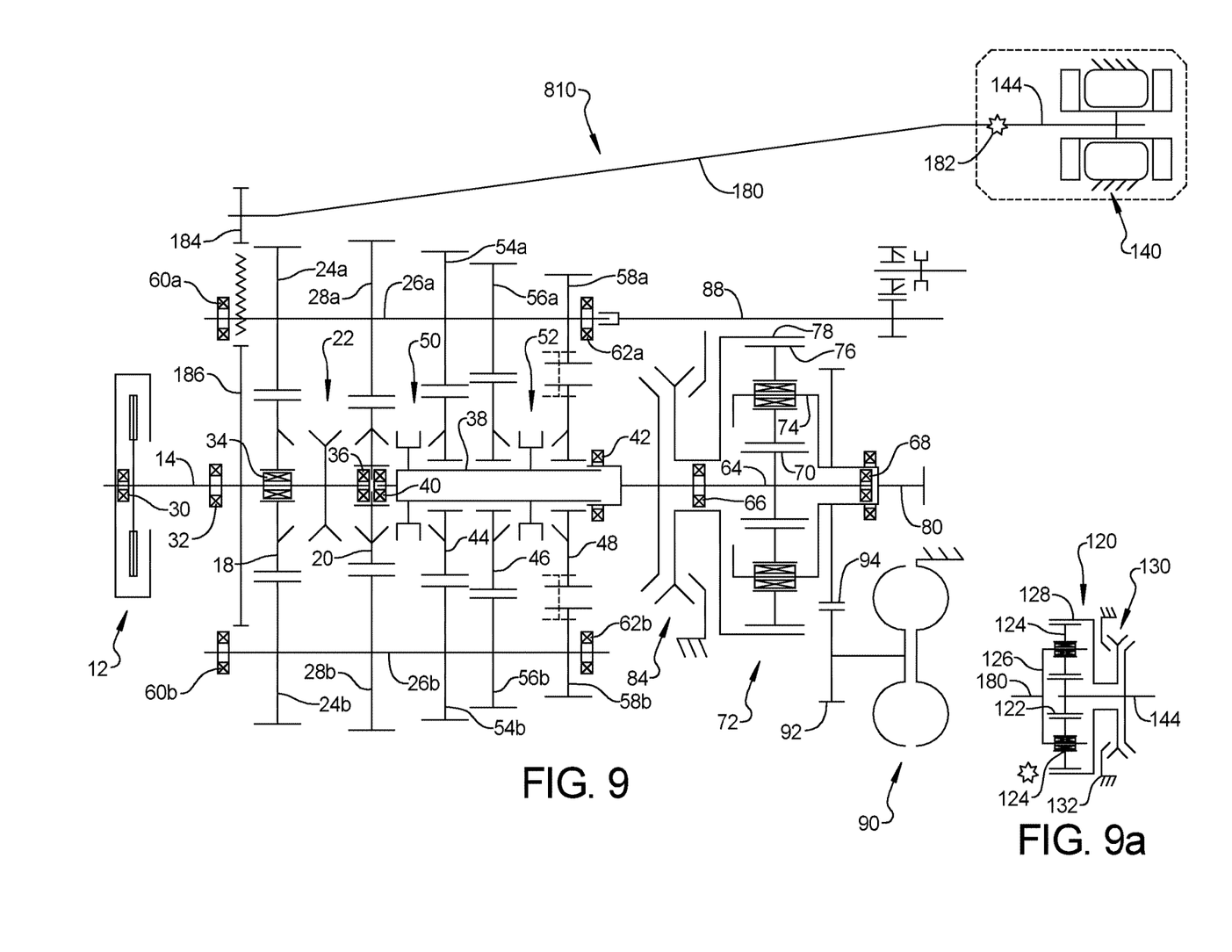
FIG. 9 is a schematic view of a hybrid automated manual transmission according to a ninth embodiment of the present disclosure.
FIG. 9a is a schematic view of an alternative connection between the motor generator and the drive gear.

With reference to FIG. 9, wherein like reference numerals are used to represent the same or similar elements as disclosed in FIG. 8, an alternative hybrid automated transmission 810 is shown wherein a motor generator 140 is mounted at a rear end of the transmission 810 and is drivingly connected to the input shaft 14. The motor generator 140 includes an output shaft 144 that is in driving engagement with an angularly arranged elongated shaft 180 via an angular compliant joint 182 that has a drive gear 184 that is in meshing engagement with a driven gear 186 on the input shaft 14. The motor generator 140 and shaft 180 provide driving input to the input shaft 14.

As a further alternative as shown in FIG. 9a, the output shaft 144 of the motor generator 140 can be connected to the drive gear 184 by a 2-speed planetary gear system 120. In particular, the output shaft 144 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 144 of the motor generator 112 or to a fixed portion 132.

Figures 10, 10A:
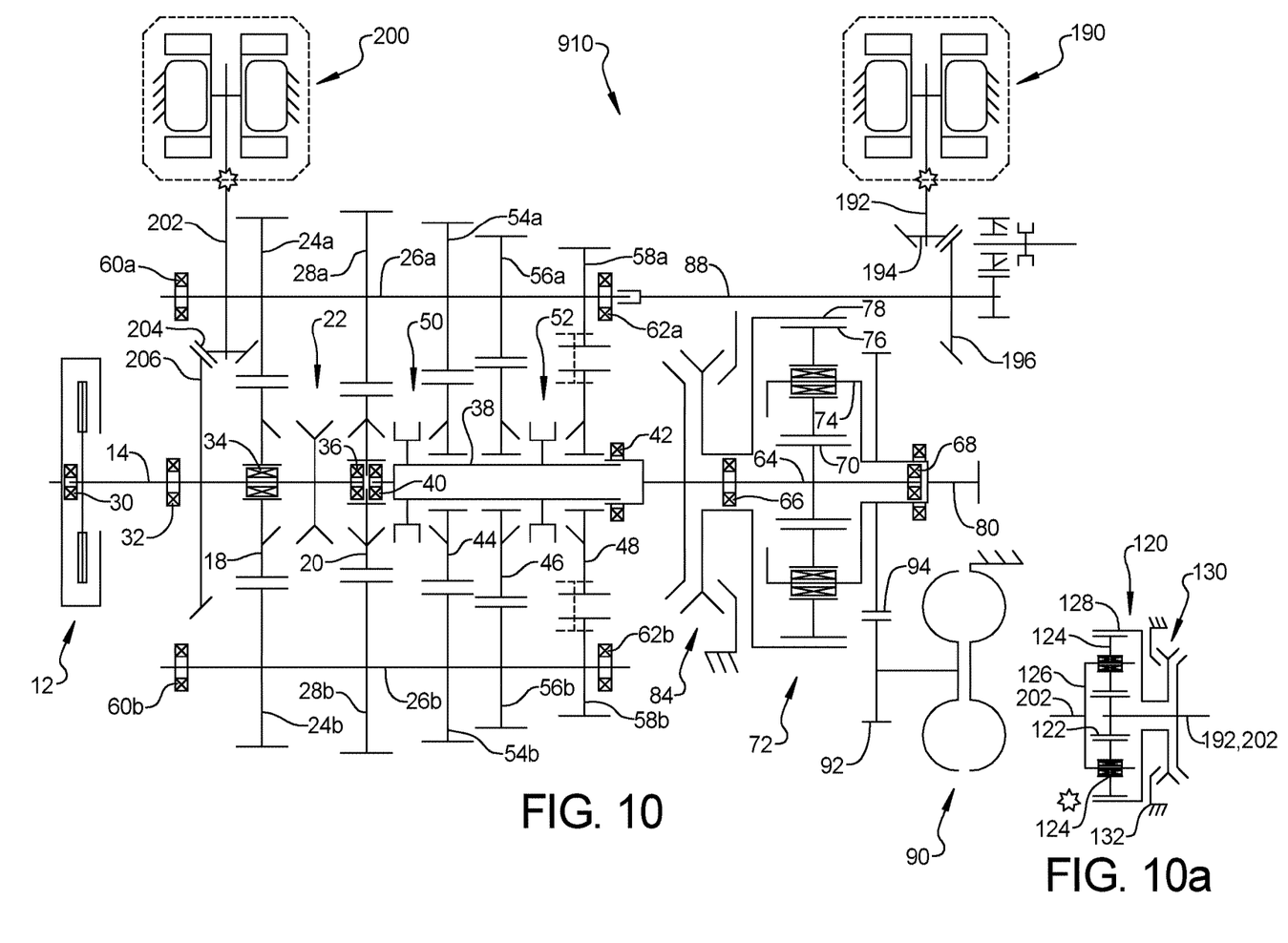
FIG. 10 is a schematic view of a hybrid automated manual transmission according to a tenth embodiment of the present disclosure.
FIG. 10a is a schematic view of an alternative connection between the motor generator and the drive gear.

With reference to FIG. 10, wherein like reference numerals are used to represent the same or similar elements as disclosed in FIG. 1, an alternative hybrid automated transmission 910 is shown wherein a first motor generator 190 is drivingly connected to the PTO shaft 88. The motor generator 190 includes an output shaft 192 that includes a drive bevel gear 194 that is in driving engagement with a driven bevel gear 196 provided on the PTO shaft 88. The motor generator 190 and PTO shaft 88 provide driving input to the countershaft 26a. A second motor generator 200 includes an output shaft 202 that includes a drive bevel gear 204 that is in driving engagement with a driven bevel gear 206 provided on the input shaft 14. The motor generator 200 provides driving input to the input shaft 14.

As a further alternative as shown in FIG. 10a, the output shaft 192, 202 of the first and second motor generators 190, 200 can be connected to the drive bevel gear 194, 204 by a 2-speed planetary gear system 120. In particular, the output shaft 192, 202 can be connected to a sun gear 122 that is in meshing engagement with a plurality of planetary gears 124 supported by a planetary carrier 126. The planetary gears 124 are in meshing engagement with a ring gear 128. A clutch 130 is provided for selectively engaging the ring gear 128 to the output shaft 192, 202 of the motor generator 112 or to a fixed portion 132.

Foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. The AMT illustrated as a 2×3×2 twin countershaft can be any variant of AMT such as single countershaft or other multi-speed architectures 6×1, 5×2, 2×4×2, 3×2×2 and so on.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A hybrid automated manual transmission, comprising:
   an input shaft conFigured to be connected to a prime mover by an input clutch;
   at least one splitter gear connectable to the input shaft;
   a main shaft coaxial with the input shaft;
   at least two main shaft gears connectable to the main shaft;
   at least one countershaft having at least one first driven gear drivingly engaged with the at least one splitter gear and at least two second driven gears drivingly engaged with the at least two main shaft gears; and
   a motor generator concentric with the input shaft and drivingly connected to the input shaft by a planetary gear system, wherein the planetary gear system includes a planetary carrier fixed to the input shaft.

2. The hybrid automated manual transmission according to claim 1, further comprising a range gear system drivingly connected to the main shaft.

3. The hybrid automated manual transmission according to claim 2, further comprising a retarder drivingly engaged with an output shaft of the range gear system.

4. The hybrid automated manual transmission according to claim 1, wherein the planetary gear system includes a sun gear connected to the motor generator.

* * * * *